United States Patent [19]

Petruchik

[11] Patent Number: 5,612,758
[45] Date of Patent: Mar. 18, 1997

[54] REWIND MECHANISM FOR SINGLE-USE CAMERA

[75] Inventor: Dwight J. Petruchik, Honeoye Falls, N.Y.

[73] Assignee: Eastman Kodak Company, Rochester, N.Y.

[21] Appl. No.: 420,260

[22] Filed: Apr. 11, 1995

[51] Int. Cl.$^6$ .................................................. G03B 1/00
[52] U.S. Cl. .................................................. 396/413
[58] Field of Search .................................. 354/204, 206, 354/212, 213, 214, 217

[56] References Cited

U.S. PATENT DOCUMENTS

| | | |
|---|---|---|
| 2,984,428 | 5/1961 | Bernhard .................................. 354/214 |
| 3,511,154 | 5/1970 | Simon .................................. 354/214 |
| 3,589,639 | 6/1971 | Engelsmann et al. .................................. 354/214 |
| 4,443,089 | 4/1984 | Sunouchi et al. .................................. 354/214 |
| 4,564,279 | 1/1986 | Sitzler et al. .................................. 354/214 |
| 4,714,335 | 12/1987 | Desormeaux .................................. 354/214 |

*Primary Examiner*—Safet Metjahic
*Assistant Examiner*—J. K. Han
*Attorney, Agent, or Firm*—Peter J. Bilinski

[57] ABSTRACT

A photographic still camera includes a rewind lever which is movable to an operative position to engage a metering lever and an actuating lever of a film advance mechanism to prevent the engagement of the metering lever and the actuating lever with a film sprocket wheel, as well as to disengage an anti-backup pawl from a film advance wheel, to allow the sprocket wheel and the film advance wheel to rotate in a reverse direction to rewind a filmstrip.

7 Claims, 5 Drawing Sheets

5,612,758

REWIND MECHANISM FOR SINGLE-USE CAMERA

FIELD OF THE INVENTION

This invention relates to operating and interlock mechanisms for still cameras and, in particular, to mechanisms which actuate the camera shutter, interlock the film advance and rewind systems to meter film advance motion, and prevent unintended film rewind. In preferred embodiments the invention relates to modification of a non-rewinding single use camera film advance mechanism to permit rewinding for application in multiple use cameras.

BACKGROUND OF THE INVENTION

It is known in the art relating to single use cameras to provide a simple shutter actuating film advance and metering mechanism. The mechanism utilizes a metering lever and an actuating lever which interact with cams on a film driven sprocket wheel to provide frame-to-frame film advance after tripping of the shutter, and resetting of the shutter actuating lever upon film advance to the next frame. A spring mounted in the camera case engages teeth on the film advance wheel to prevent reverse rotation. No provision is made for rewinding of the film with this mechanism as it is not required for single use cameras.

SUMMARY OF THE INVENTION

The present invention provides embodiments based upon the prior single use camera mechanism to which a rewind lever has been added. When actuated, the rewind lever disconnects the metering and actuating levers from their cams and separates the reverse prevention means from the film advance wheel so that rewinding of the film is permitted. Thus, the improved mechanism can be used in multiple use cameras. Various specific features may be included in the mechanism such as, for example, incorporation of the anti-backup feature in the rewind lever and automatic locking of the manually set rewind lever in the rewind position. Resetting the rewind lever accomplished by a subsequent manual action such as advancing film from a replacement cartridge after installation in the camera or opening of the camera film door for film replacement after rewind.

These and other features and advantages of the invention will be more fully understood from the following detailed description of the invention taken together with the accompanying drawings.

DETAILED DESCRIPTION OF THE INVENTION

Figure 1:
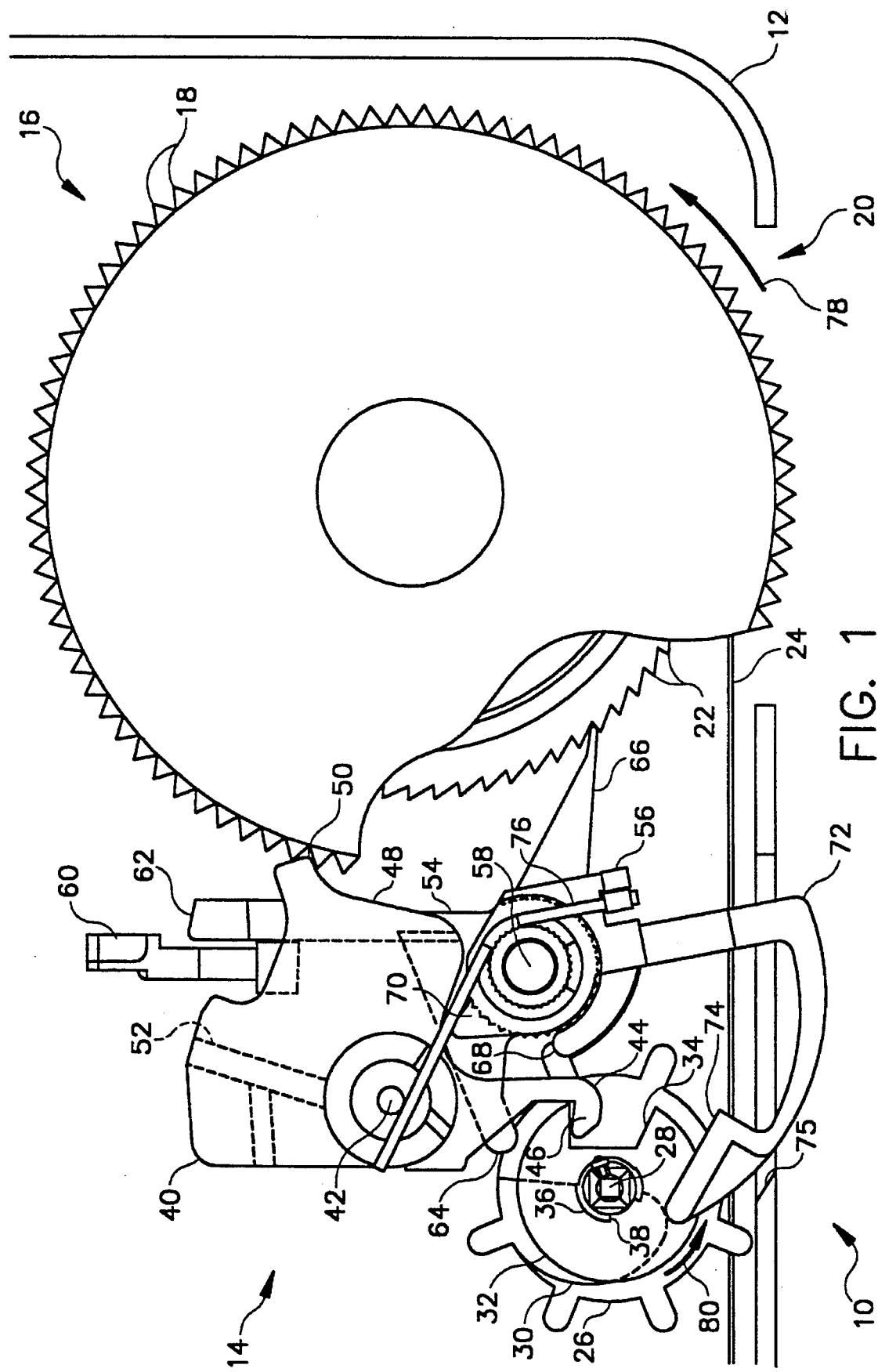
FIG. 1 is a fragmentary cross-sectional view of a camera having an operating and interlock mechanism in accordance with the invention and shown in the shutter cocked position.
Figure 2:
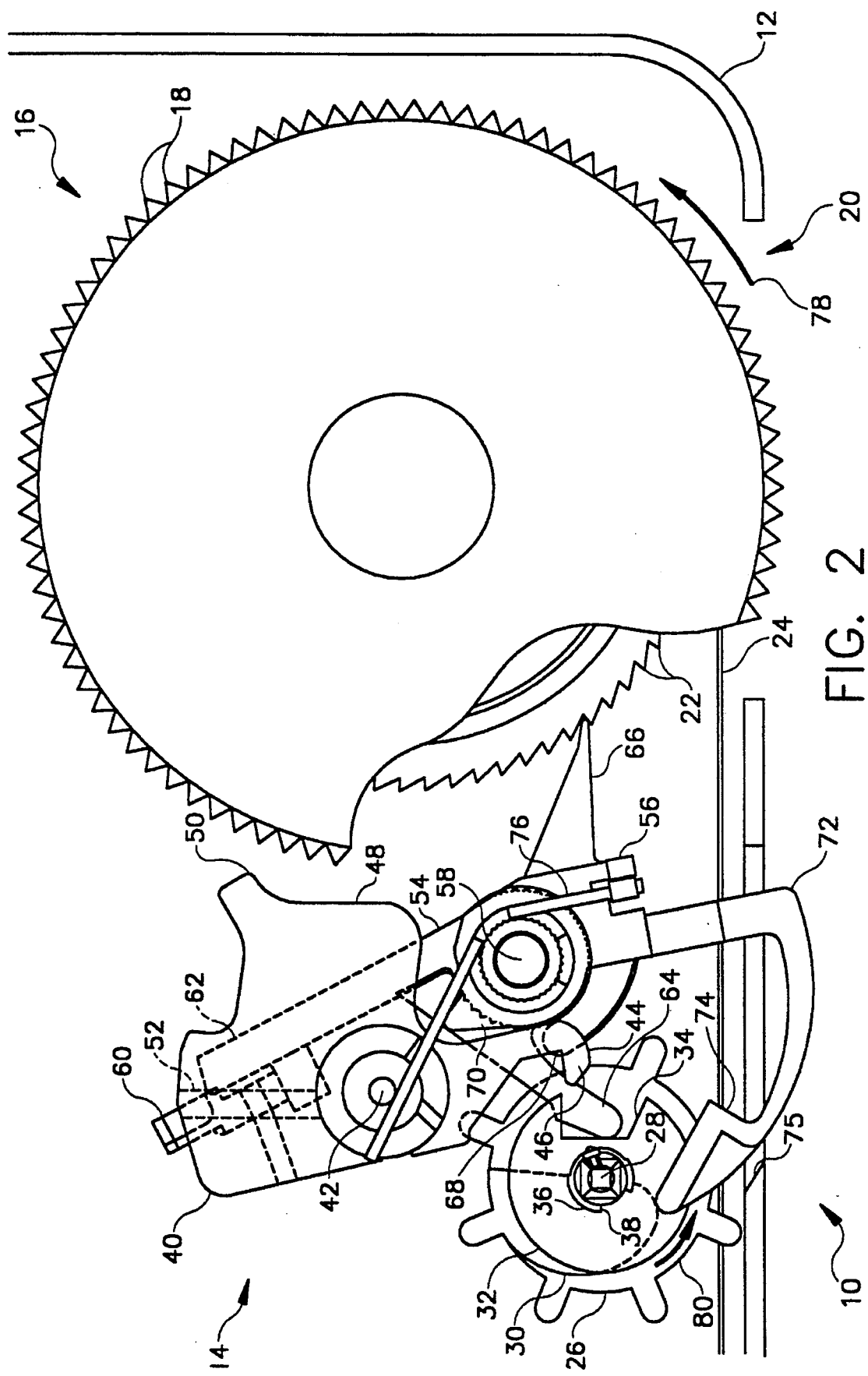
FIG. 2 is a view similar to FIG. 1 but showing the mechanism in the shutter tripped position.
Figure 3:
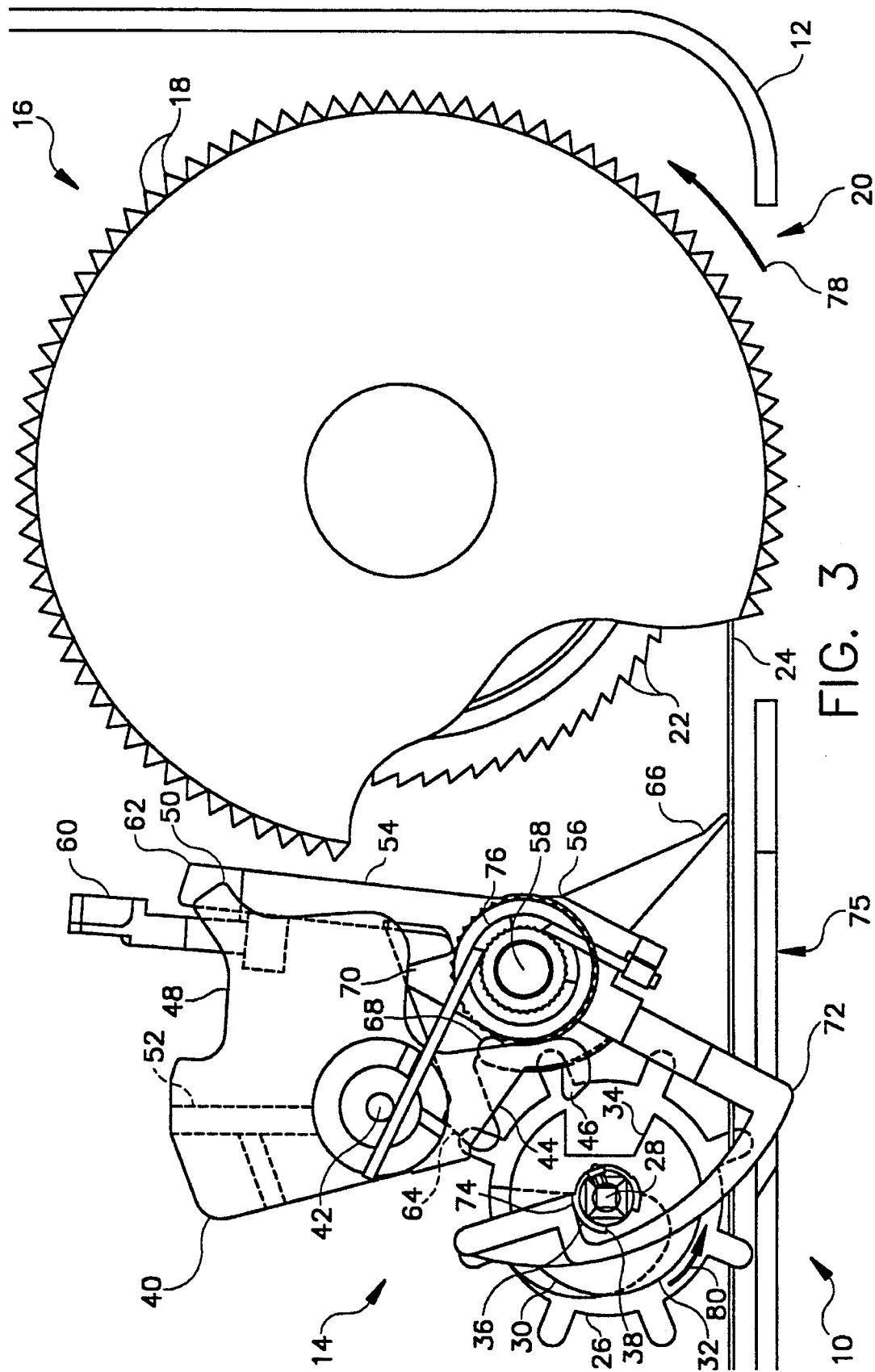
FIG. 3 is a view similar to FIGS. 1 and 2 showing the mechanism in the rewind position.

Referring now to FIGS. 1–3 of the drawings in detail, numeral 10 generally indicates a photographic still camera of the type having a view finder separate from the lens and sometimes known as a point and shoot camera. Camera 10 includes a case 12 having an operating and interlock mechanism 14 according to the invention.

Mechanism 14 includes a film advance wheel 16 having an outer periphery provided with metering teeth 18 and a portion of which extends through a slot 20 in the back of the case 12 for manual engagement of the wheel by a thumb or finger of the camera operator. At a smaller diameter and below the level of the metering teeth, the advance wheel 16 further includes an annular row of anti-backup teeth 22.

The advance wheel 16 connects with a film spool, not shown, onto which a photographic film 24 is wound from a cartridge, not shown, near the other end of the camera. The film includes perforations, not shown, which are engaged by the teeth of a sprocket wheel 26 that is rotatable on an axis 28 and forms part of the operating and interlock mechanism of the present invention. Rotatable with the sprocket wheel upon movement of the film are an eccentric reset cam 30, a cylindrical cam 32 having a recess 34, and a hub 36 having a reset tooth 38.

Mechanism 14 further includes a metering lever 40 pivotally mounted for oscillating motion on a second axis 42 spaced generally forward of the sprocket wheel axis 28. Lever 40 is biased in a clockwise direction by a spring, not shown, and includes a first arm 44 having a hook-like finger 46 engageable with the cam recess 34. A second arm 48 has a corner portion 50 that is engageable with the metering teeth 18 of the advance wheel when the finger 46 is received in the recess 34. An abutment 52 on the underside of the lever 40 has a purpose to be subsequently described.

Additionally included in the mechanism 14 are an actuating lever 54 and a rewind lever 56, both pivotable about a third axis 58 spaced between the advance wheel 16 and the other two axes 28,42. The actuating lever 54 includes a shutter arm 60 and release arm 62, both extending from a common leg, as well as a reset arm 64. The actuating lever 54 is biased in a counterclockwise direction as viewed in the figures by a high energy spring not shown.

The features so far described, except for the rewind lever and certain details such as the reset tooth 38 on the sprocket wheel hub, are similar to those of film metering and advance mechanisms used in prior single use cameras which have no provision for film rewind. The present invention improves these simple mechanisms by the addition of the rewind lever 56 and associated features which provide a rewind function in a mechanism based on the simple prior art non-rewinding mechanism. The rewind lever 56 includes a pawl arm 66, and an abutment 68, a cam 70 and a positioning arm 72. A lock hook 74 extends clockwise from the outer end of the positioning arm 72 which extends out through a slot 75 in the back of the camera case 12. A torsion spring 76 biases the rewind lever 56 in a counterclockwise direction as viewed in the figures.

Operation of the embodiment of operating and interlock mechanism just described will be illustrated by reference to FIGS. 1–3 of the drawings. With the mechanism 14 in the shutter cocked position shown in FIG. 1, the release arm 62 is held in the cocked, or set, position by the camera shutter button, not shown. Finger 46 of the metering lever 40 is received in the recess 34 of cam 32, allowing the corner portion 50 of the metering lever second arm 48 to engage the metering teeth 18 and prevent further advancement of the advance wheel 16. At the same time, pawl arm 66 of the rewind lever is biased by spring 76 into engagement with the anti-backup teeth 22 to prevent reverse rotation of the advance wheel 16. In this position, the camera is ready for actuation by the operator to take a photograph.

Upon actuation of the shutter button, not shown, by the operator, the release arm 62 is released and the high energy spring, not shown, moves the actuating lever 54 counterclockwise. This causes the shutter arm 60 to trip the camera shutter, not shown, and moves the reset arm 64 into the tripped position shown in FIG. 2. The counterclockwise motion of the actuating lever also causes the release arm 62 to engage abutment 52 of the metering lever 40 and pivot lever 40 counterclockwise so that finger 46 is moved out of the recess 34 and corner portion 50 of second arm 48 is pulled away from the metering teeth 18 of the advance wheel, all as shown in FIG. 2. At this point, the mechanism is ready for the operator to move the advance wheel in the counterclockwise direction indicated by arrow 78 to advance the film to the next photo location.

Rotation of the advance wheel 16 as indicated by arrow 78 moves the film 24 toward the right as shown in the drawings and rotates the sprocket wheel 26 counterclockwise, as shown by arrow 80. One full turn of the sprocket wheel 26 is caused by advancement of the film to the next photo location. During this movement, the eccentric reset cam 30 is rotated to engage the reset arm 64 and pivot the actuating lever 54 clockwise to its set position where the release arm 62 is again engaged by the shutter button, not shown. This motion also releases abutment 52 so that the metering lever 40 may be moved clockwise by its torsion spring not shown. Thus, when cylindrical cam 32 is rotated a full turn with the sprocket wheel 26, finger 46 drops into recess 34 and corner portion 50 is moved into engagement with the metering teeth 18, stopping further advance motion of advance wheel 16 and locking the film in position for the next photograph.

When the last photograph of the film roll has been taken and it is desired to again rewind the film into the cartridge, not shown, the operator moves the positioning arm 72 leftward as shown in the figures, pivoting the rewind lever clockwise until the lock hook 74 passes over hub 36 and locks into engagement with the far side of the hub. This holds the rewind lever in the rewind position shown in FIG. 3. In this position, pawl arm 66 is moved out of engagement with anti-backup teeth 22, abutment 68 engages reset arm 64 forcing the actuating lever 54 clockwise so that arm 64 is beyond the outer radius of the reset cam 30, and cam 70 engages the second arm 48 pivoting the metering lever 40 counterclockwise so finger 46 is out of recess 34 and corner 50 releases the metering teeth 18. Since both the advance wheel 16 and the sprocket wheel 26 are then free to rotate, the operator may turn the rewind crank or wheel, not shown, and rewind the film into the cartridge, not shown, at the other end of the camera.

Upon removal of the exposed film cartridge and replacement with a new cartridge, the film is threaded in conventional manner into the camera and connected with the spool driven by the advance wheel 16. When the wheel 16 is turned to advance the film, the sprocket wheel 26 is again rotated in the counterclockwise direction of arrow 80. During this motion, reset tooth 38 engages the edge of lock hook 74, lifting the hook off hub 36 and allowing spring 76 to drive rewind lever 56 counterclockwise, back to its initial advance position. There, pawl arm 66 again engages the anti-backup teeth 22 and the metering lever 40 and actuating lever 54 are released to operate in their normal manner to meter the film advance and set the shutter actuating mechanism.

Figure 4:
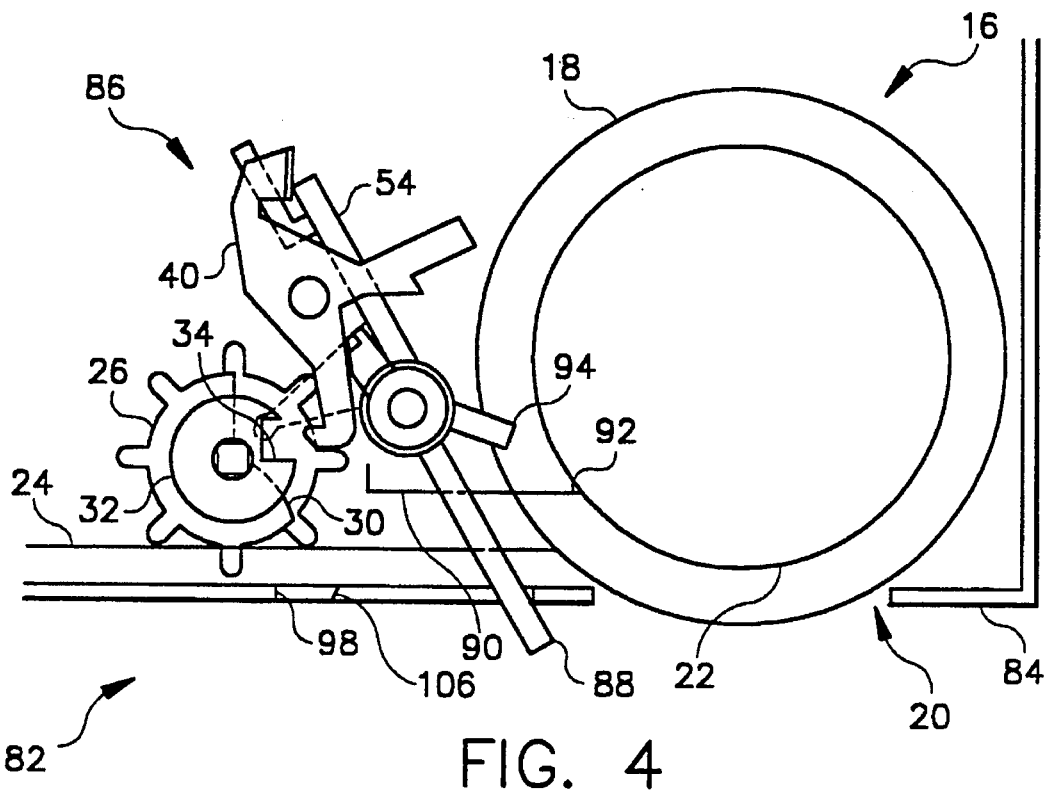
FIG. 4 is a schematic cross-sectional view of an alternative embodiment of camera operating and interlock mechanism shown in the shutter tripped position.
Figure 5:
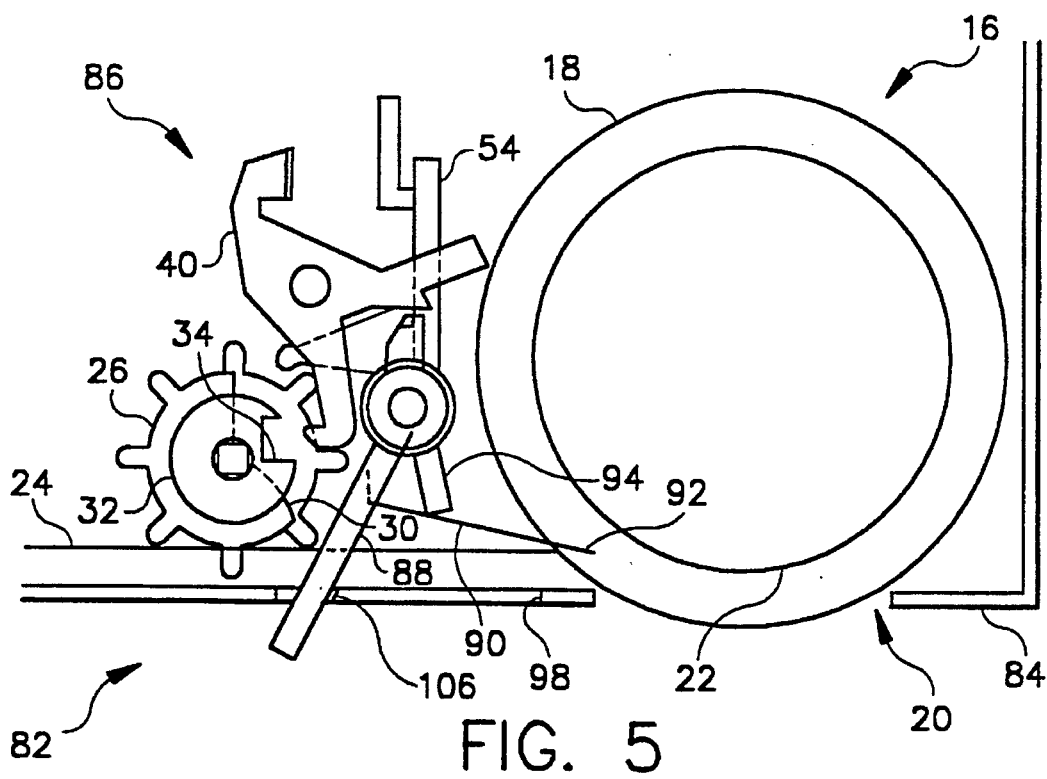
FIG. 5 is a view similar to FIG. 4 but showing the mechanism in the rewind position.
Figure 6:
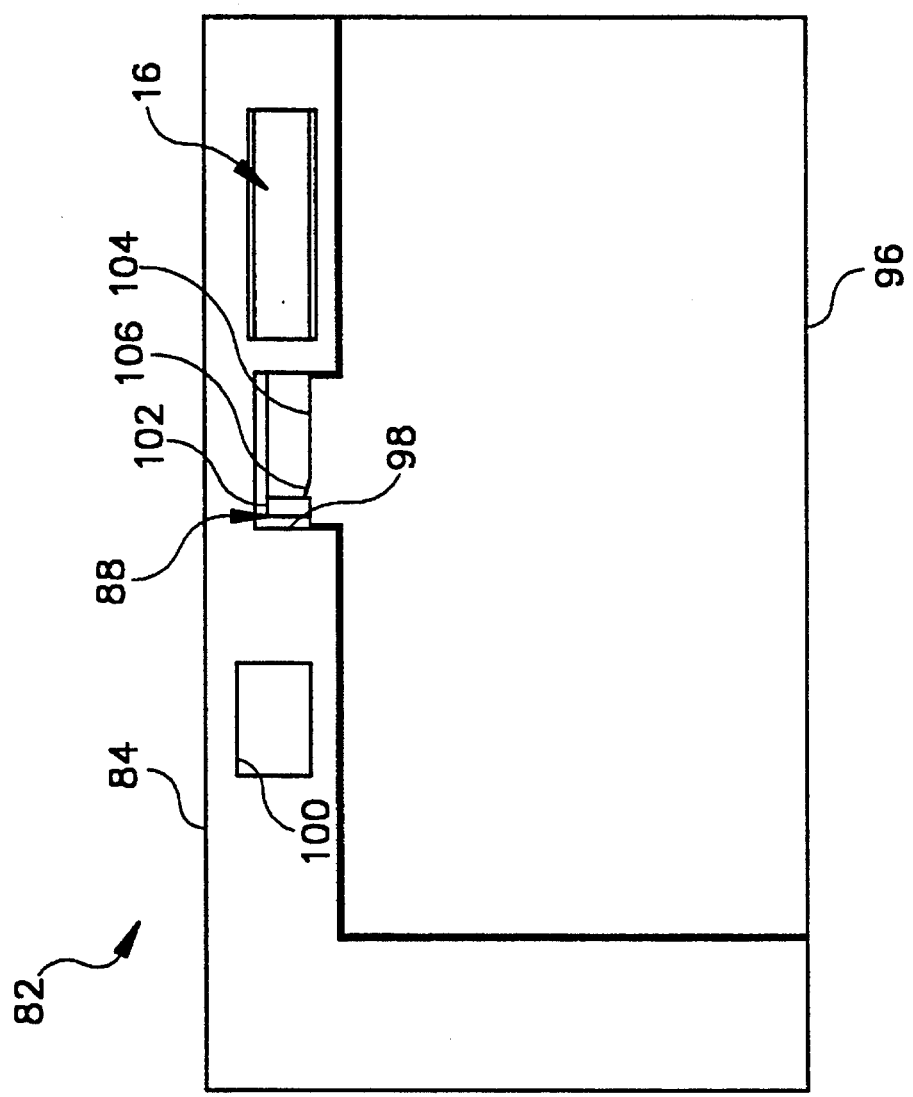
FIG. 6 is a rear view of the camera of FIGS. 4 and 5 showing the means for locking the rewind lever with the film door.

FIGS. 4–6 of the drawings illustrate an alternative embodiment of camera 82 having a case 84 containing a varied form of operating and interlock mechanism according to the invention. Mechanism 86 is similar in many respects to the mechanism previously described so that like numerals indicate like parts. Thus mechanism 86 includes an advance wheel 16 having metering teeth 18 extending through a slot 20 in the camera case and anti-backup teeth 22 as before. A sprocket wheel 26 engaging perforations in film 24 includes an eccentric reset cam 30, a cylindrical cam 32 with recess 34 as in the previous embodiment. Also a metering lever 40 and an actuating lever 54 are provided which are similar to and operate in the same manner as those of the prior embodiment.

Mechanism 86 further includes a rewind lever 88 which interacts with and actuates both the metering lever 40 and the actuating lever 54 in the same manner as in the previously described embodiment. Lever 88 is preferably biased counterclockwise by a spring, not shown. However, reverse rotation of the advance wheel 16 is prevented by a spring 90 having a pawl end 92 which engages the anti-backup teeth 22. A rewind arm 94 on the rewind lever engages the spring 90 to disconnect it from the anti-backup teeth 22 when lever 88 is in the rewind position shown in FIG. 5.

FIG. 6 shows a back view of camera 82 illustrating the film door 96 which is pivotably openable in order to remove or install a film cartridge. Above the door, a slot 98 is provided between a view finder 100 and film advance wheel 16 in the camera case. A positioning arm 102 of rewind lever 88 extends through the slot 98 for manual actuation by the camera operator. When the operator moves the rewind lever 88 to the rewind position of FIG. 5, arm 102 moves along a raised portion 104 of the door 96 past a lip 106 which engages the positioning arm 102 of the rewind lever 88 to lock it in position during rewind operation. When rewind is completed, the camera operator opens the film door 96 to remove the cartridge. This action disconnects the lip from the positioning arm 102, allowing the rewind lever 88 to be returned by its spring, not shown, to the advance position shown in FIG. 4. At this point, the camera 82 is ready to have another film cartridge installed and loaded after which normal advance movement of the film advance mechanism will be possible.

In yet a third embodiment, the locking lip 106 may be deleted from the camera door so that the camera operator will be required to hold the rewind lever in the rewind position in order to rewind the film. The operator will then release the lever so that the mechanism is reset for film advance operation as before.

Although the invention has been described by reference to various specific embodiments, it should be understood that numerous changes may be made within the spirit and scope of the inventive concepts described. Accordingly, it is intended that the invention not be limited to the described embodiments, but that it have the full scope defined by the language of the following claims.

Parts List 10. camera
12. case
14. mechanism
16. advance wheel
18. metering teeth
20. slot
22. anti-backup teeth
24. film
26. sprocket wheel
28. axis
30. eccentric reset cam
32. cylindrical cam
34. recess
36. hub
38. reset tooth
40. metering lever
42. second axis
44. first arm
46. finger
48. second arm
50. corner portion
52. abutment
54. actuating lever
56. rewind lever
58. third axis
60. shutter arm
62. release arm
64. reset arm
66. pawl arm
68. abutment
70. cam
72. positioning arm
74. lock hook
75. slot
76. torsion spring
78. arrow
80. arrow
82. camera
84. case
86. mechanism
88. rewind lever
90. spring
92. pawl
94. rewind arm
96. film door
98. slot
100. view finder
102. positioning arm
104. raised portion
106. lip

What is claimed is:

1. A still camera having an operating and interlock mechanism comprising:

a film advance mechanism including an advance wheel;

a sprocket wheel engageable with a film and rotatable by linear motion thereof within the camera;

a metering lever pivotable about an axis and biased toward engagement with the advance wheel, said metering lever coacting with a recess on the sprocket wheel to allow engagement of the metering lever with the advance wheel only at spaced intervals of film motion and preventing film advance when so engaged;

an actuating lever pivotable about an axis and biased for tripping a camera shutter when released, said actuating lever when tripped engaging the metering lever to release said actuating lever from said recess and allow further film advance;

said sprocket wheel having a cam engageable with said actuating lever upon rotation of the sprocket wheel during film advance to reset the actuating lever and release the metering lever to reengage the sprocket wheel recess and prevent further film advance after a predetermined film advance motion;

an anti-backup pawl biased toward engagement with said advance wheel for preventing reverse rotation of the advance wheel in a rewind direction; is characterized by:

a rewind lever pivotable about an axis and movable into separate advance and rewind positions;

said rewind lever being operative in said rewind position to disengage said anti-backup pawl from said advance wheel and to engage said metering lever and said actuating lever, said rewind lever being operative in said rewind position to prevent engagement of said metering lever and said actuating lever with said sprocket wheel, said rewind lever thereby allowing reverse motion of the advance wheel and the sprocket wheel to permit rewinding of the film.

2. The invention as in claim 1, wherein said anti-backup pawl is integral to said rewind lever and only engages said film advance wheel in the advance position.

3. The invention as in claim 1, wherein said anti-backup pawl is carried on a spring and said rewind lever includes means for engaging the spring in the rewind position to disengage the anti-backup pawl from the film advance wheel.

4. The invention as in claim 1, wherein said rewind lever is nominally biased toward the advance position and when moved to the rewind position is locked therein until released.

5. The invention as in claim 4, wherein said rewind lever is locked in said rewind position by engagement with a film door of the camera and is released by opening of the film door to replace a film cartridge.

6. The invention as in claim 4, wherein said rewind lever is locked in said rewind position by engagement of a lock hook portion with a hub rotatable with said sprocket wheel and is released by disengagement of the lock hook by a reset tooth on said hub.

7. The invention according to claim 1, wherein said rewind lever and said actuating lever are pivotable about the same axis.

* * * * *